Patented Aug. 31, 1948

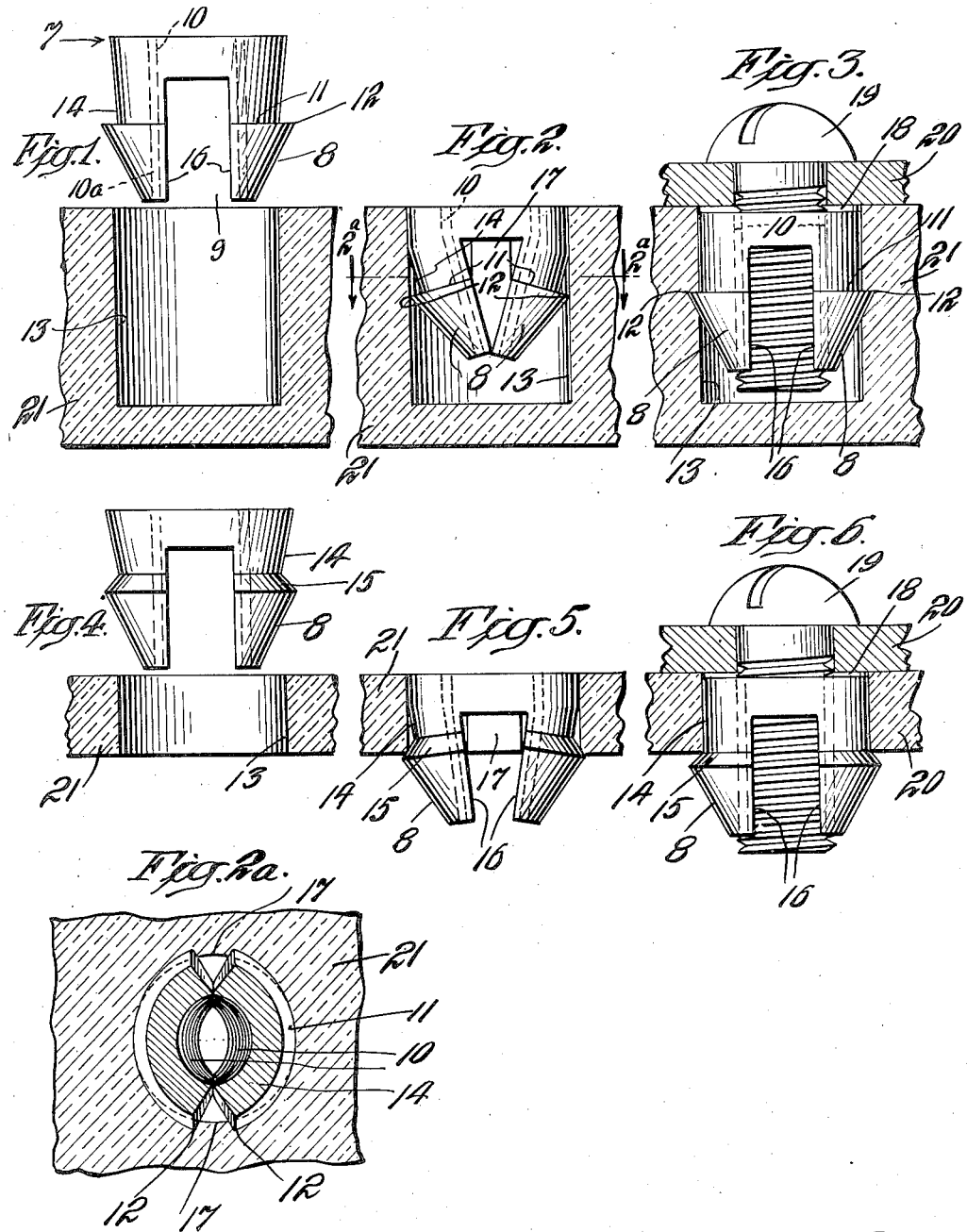

2,448,351

UNITED STATES PATENT OFFICE 2,448,351

TAPPED FASTENER

Abbott P. Brush, Greenwich, Conn.

Application January 23, 1946, Serial No. 642,851

2 Claims. (Cl. 85—2.4)

1

The invention here disclosed relates to tapped fasteners and is a continuation in part of the invention covered in patent application, Serial No. 541,074, filed June 19, 1944, issued as United States Patent No. 2,393,606, January 29, 1946.

In some installations it is desirable that the inserted portion of the fastener, that is, the part forming the tapped hole for the screw, be seated flush or below the surface of the material in which the insert is mounted.

Also, for mounting in some of the softer materials it is desirable that the insert be made to cut into the material.

Special objects of the present invention are to provide a fastener which will meet these particular requirements and which at the same time will incorporate the self-locking features of the basic invention covered in the patent identified.

Other special objects of the invention are to provide a fastener having the characteristics and advantages mentioned, which will be small in overall dimensions so that it may be used in places where space is limited and which will be generally practical and efficient for fastener purposes.

Other desirable objects and the novel features by which the purposes of the invention are attained are set forth or will appear in the course of the following specification.

The drawing accompanying and forming part of the specification illustrates certain present embodiments of the invention but structural details may be modified and changed as regards the immediate illustration, all within the true intent and proper scope of the invention as hereinafter defined and claimed.

Figure 1 in the drawing is a side elevation and broken sectional view showing one of the fasteners in position for driving in a hole of the size for which it is designed.

Figure 2 is a similar view showing the fastener insert driven flush in the hole and locked against rotation, and Figure 2a is a section on line 2a—2a of Fig. 2.

Figure 3 is a similar view showing the screw entered and the fastener insert locked against withdrawal as well as against rotation.

Figures 4, 5 and 6 are views corresponding to Figures 1, 2 and 3 illustrating a form of the fastener designed for mounting in a thin panel.

The body of the insert, as in the patent identified, is in the nature of a tubular stud 7 beveled or tapered at 8 at the entering end and slotted from that end inwardly to near the opposite end at 9 to divide the shank portion of the device into separated segments.

The unslotted, driving end of the stud is shown as having a cylindrical screwthreaded passage 10 therethrough, continued and extending at 10a down the inner faces of the split apart segments.

The conical end portions 8 of the segments, in the first form of the invention illustrated, terminate in a relatively abrupt shoulder 11 providing on the segments, external, sharp, substantially semi-circular cutting edges 12. These partly circular shoulders in the form of the unit as illustrated in Figure 1 are of greater diameter than the drilled or punched hole 13 in which the unit is to be used.

Above the sharply defined shoulder 11 the shank of the insert may be substantially cylindrical or tapered slightly from the top downward to said shoulder substantially as indicated at 14.

The second form of the invention illustrated differs from that first described in that the shoulder back of the front or end bevel 8 is somewhat less abrupt, being indicated in Figure 4 as a flat bevel or cone 15.

Where the device is to be used in materials such as wood and some of the softer plastics and is to be fully embedded, the first form of the invention may be employed.

Either before or in the act of driving, the segments are collapsed or converged as indicated in Figure 2 and in driving the element in this condition, the sharp cutting edges 16 at the opposite sides of the slot adjoining the shoulder 11, being of greater diameter than the hole, cut into the material at the sides of the hole forming keyways 17 which lock the insert as so driven against rotation in the hole.

The taper 14 of the headless shank may be such as to make a tight drive fit as the element is hammered into the flush position indicated in Figure 2. Locked rotatively and held longitudinally by the slight taper drive fit in the hole the insert is fully secured and may be left indefinitely in the condition shown in Figure 2, ready to receive a screw whenever it is to be put to use.

Figure 3 shows how with entry of the screw the segments will be forced apart and the sharp circular edges 12 be caused to bite into the surrounding material. This wedging apart also causes the segments to act as levers drawing the insert down more firmly into seated relation in the hole. This final drawing down, as shown in Figure 3, may establish a slight clearance at 18 between the driven end of the stud and the surface of the material. This is of advantage in enabling the screw 19 to draw a supported object 20 up tight and flat against the face of the panel or support 21 in which the hole is formed.

For mounting in a thinner panel, the form of the invention shown in Figures 4, 5 and 6 may be preferred.

The action of this second form is substantially as described except that in passing through the layer of thinner material, the less abrupt shoulder 15 will engage the back edge of the hole and then operate as a toggle to pull the stud more firmly down in its seat as the screw is inserted, Figure 6.

In both forms of the invention the screw is frictionally held and retained in the insert which then acts as a lock for the screw.

The fasteners may be produced at low cost and can be quickly mounted by just driving them in place with a hammer.

The outer headless end of the shank provides a flat non-slipping driving surface for the hammer. In this driving operation or if the insert be previously collapsed or converged ready for driving, the smaller tapered ends of the shank segments may actually come together, as indicated in Figure 2. In this relation the segments will have been collapsed sufficiently to bring the outer edges of the circular shoulders, across the slot down to approximately the diameter of the hole so as not to materially cut away the material of the hole in this driving operation.

What is claimed is:

1. A hammer driven headless self-securing screw seat forming insert adapted to be anchored and secured against rotation in a circular hole by a simple driving operation and comprising a flat ended headless tubular stud having a split tubular shank for anchoring and holding it against rotation, said shank having a beveled conical tapered end portion for entry in the hole and a sharply angled shoulder meeting intermediate the length of the shank in a sharply defined annular ridge normally circular in cross section, said tubular shank extending from the opposite end inwardly on a slight taper to said abruptly angled shoulder and being slotted inwardly in a single wide slot extending longitudinally from the tapered entry end past said shoulder and thereby separated into two opposed segments, said stud having a circular screw-threaded passage through the headless flat driving end of the same and continuations of said same screw passage on the opposing inner faces of the separated shank segments and said two separated shank segments being convergently collapsed toward each other in sharply angled relation and in contacting engagement so that the opposing walls of the slotted portion at said normally circular annular ridge will form inclined cutting edges to dig into the opposite sides of the wall of a circular hole into which the insert is driven.

2. A hammer driven self-securing screw seat forming insert adapted to be anchored and secured against rotation in a circular hole by a simple hammer driving operation and comprising a blunt ended generally cylindrical tubular stud having a tapered conical end portion for entry in the hole, said conical end portion enlarging to a maximum diameter, said maximum diameter portion being normally circular in cross section and located intermediate the overall length of the stud and connected with the generally cylindrical portion of the stud by an abruptly angled shoulder, said stud being slotted inwardly from said entry end in a single wide slot extending beyond said abruptly angled shoulder into said generally cylindrical portion and thereby dividing the stud into two widely separated opposed segments, said slot having substantially parallel side walls forming outstanding sharp edges where said walls intersect the normally circular maximum diameter portion and said tubular stud having a substantially cylindrical passage therethrough, said segments being sharply inclined toward each other into contacting engagement and thereby forming said opposed slotted walls as outstanding inclined cutting edges for digging into the opposed side walls of a circular hole into which the screw seat is driven.

ABBOTT P. BRUSH.

REFERENCES CITED

The following references are of record in the file of this patent:

UNITED STATES PATENTS

| Number | Name | Date |
|---|---|---|
| 1,978,935 | Douglas | Oct. 30, 1934 |
| 2,370,327 | Rosan | Feb. 27, 1945 |
| 2,379,786 | Bugg | July 3, 1945 |